G. KNEWITZ.
MACHINE FOR MEASURING AND WRAPPING POWDERS.
APPLICATION FILED SEPT. 15, 1920.
1,434,248.
Patented Oct. 31, 1922.
4 SHEETS—SHEET 1.
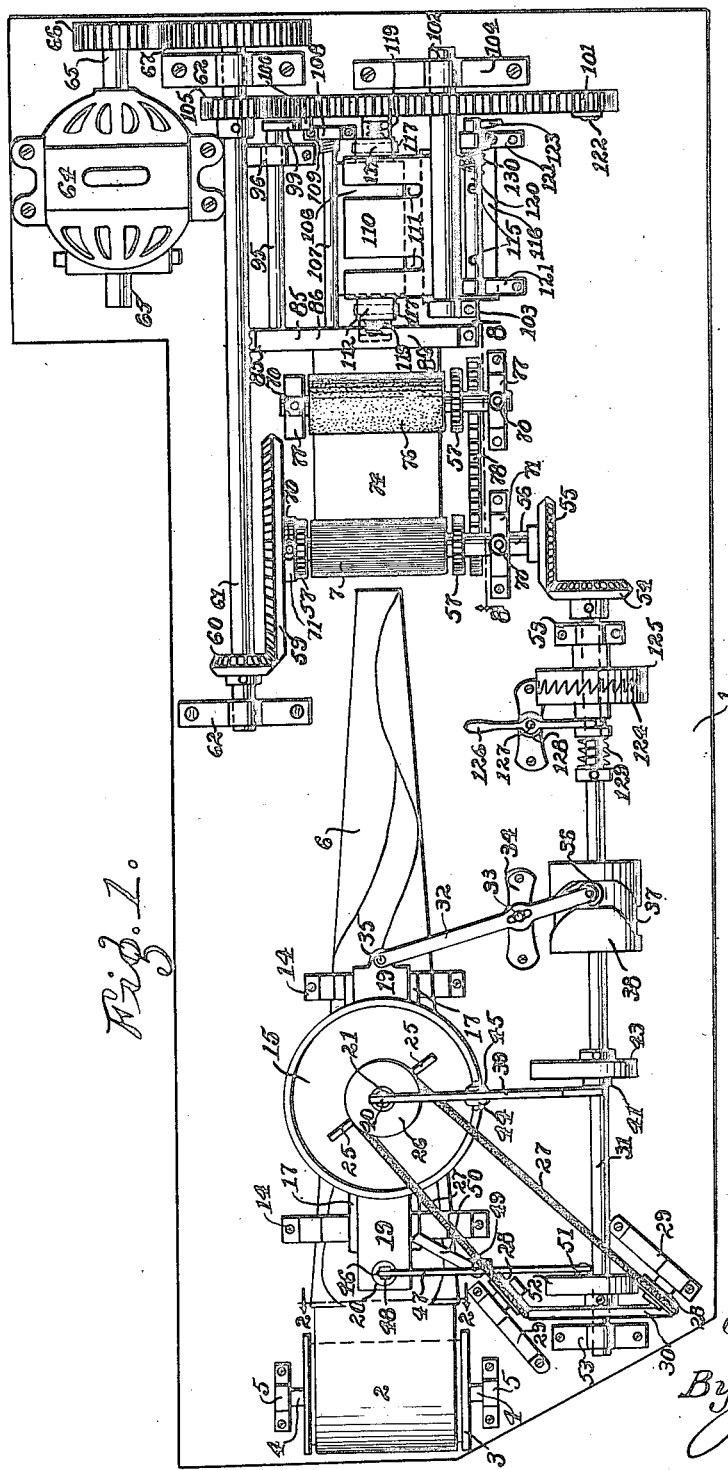
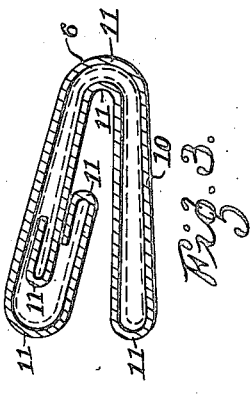
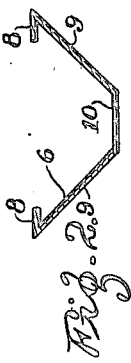
Inventor:
Gerhard Knewitz.
By John C. Higdon
Atty.

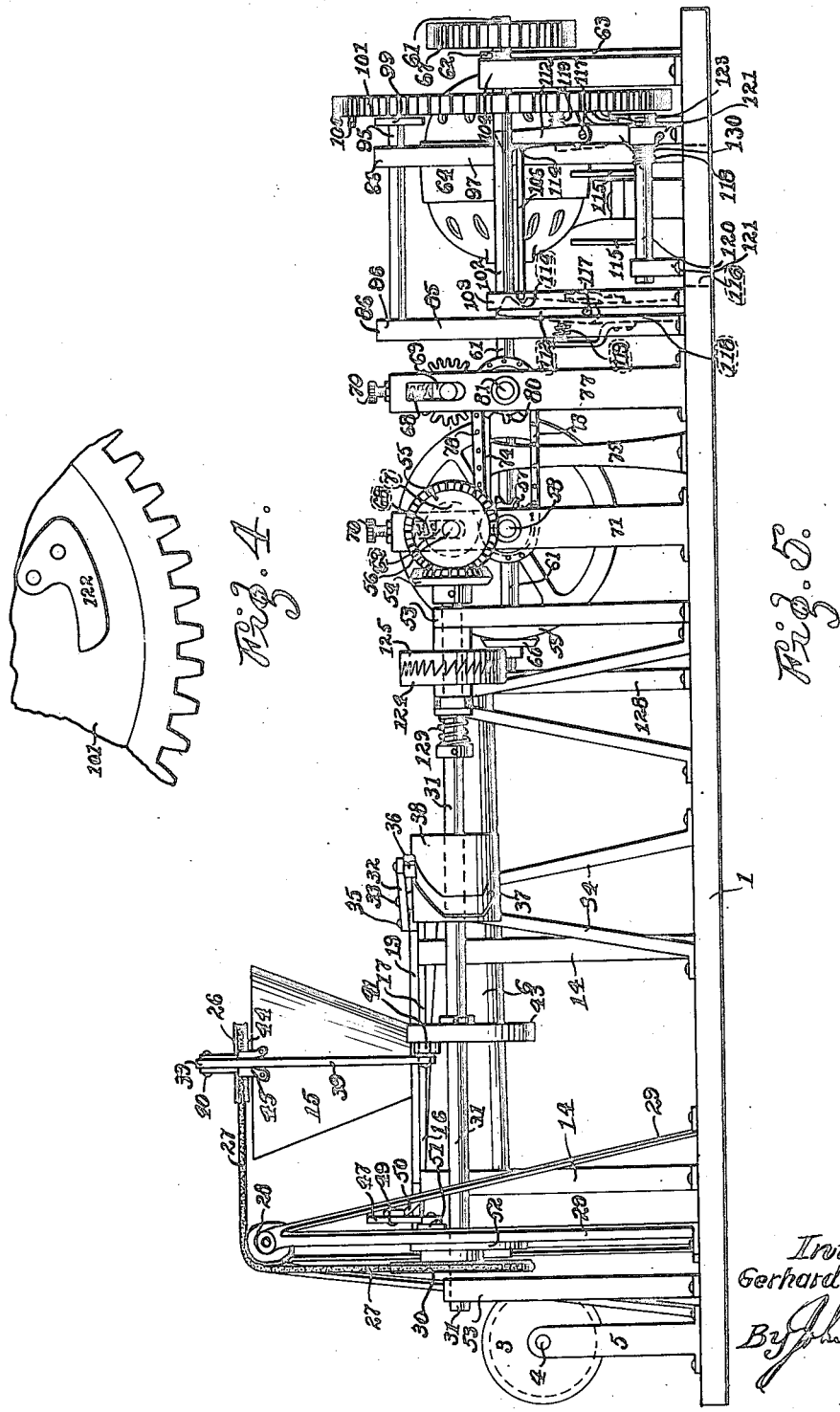

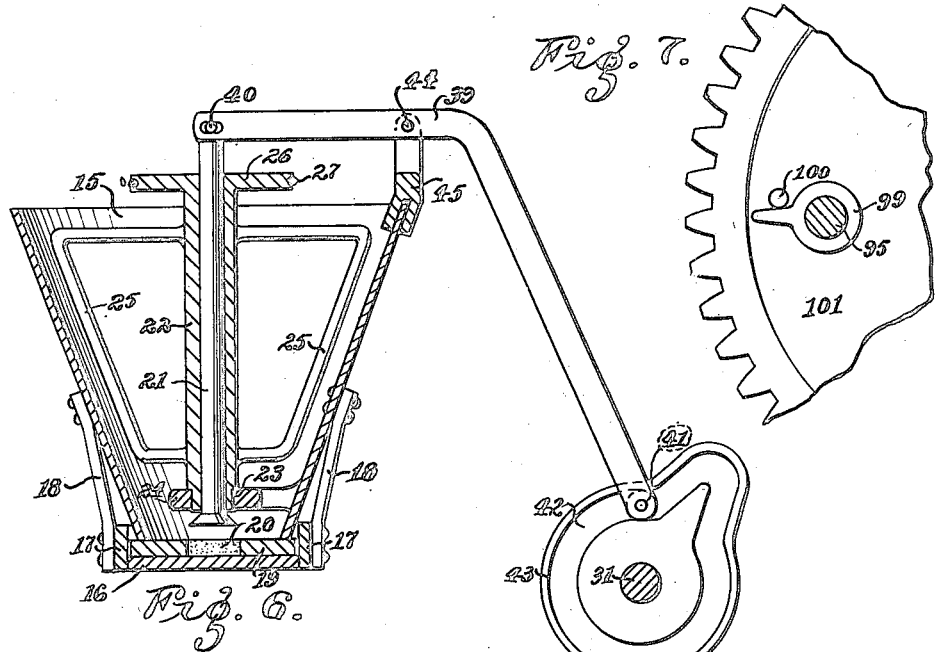
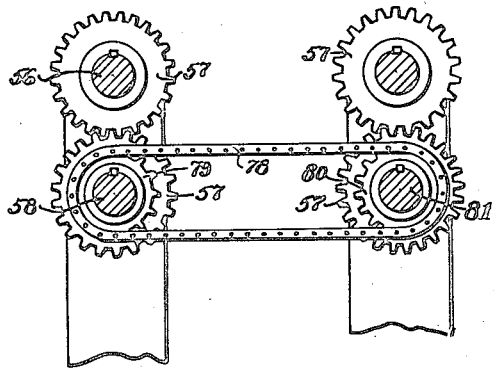
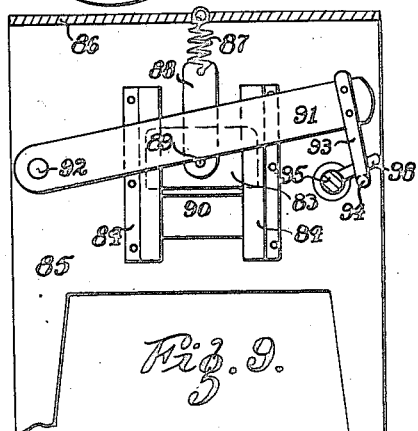
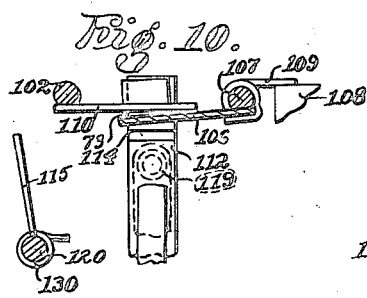
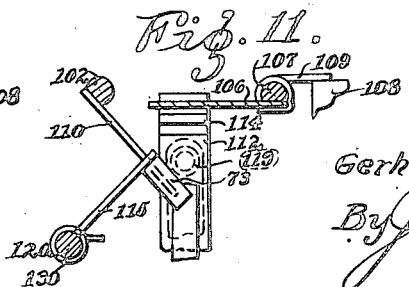

Patented Oct. 31, 1922.

1,434,248

UNITED STATES PATENT OFFICE.

GERHARD KNEWITZ, OF EAST ST. LOUIS, ILLINOIS.

MACHINE FOR MEASURING AND WRAPPING POWDERS.

Application filed September 15, 1920. Serial No. 410,515.

*To all whom it may concern:*

Be it known that I, GERHARD KNEWITZ, a citizen of the United States, residing at East St. Louis, St. Clair County, Illinois, have invented certain new and useful Improvements in Machines for Measuring and Wrapping Powders, of which the following is a specification, containing a full, clear, and exact description, reference being had to the accompanying drawings forming a part thereof.

My invention consists in the novel disclosure hereinafter particularly described and distinctly claimed.

The object of my invention is to improve and simplify the mechanism and method used in folding paper wrappers containing medicinal and other powders, and at the same time to increase the efficiency and economy of the machines used in practicing the method; thereby providing machines of low cost that are especially adapted for use by druggists and pharmacists, as well as by the large manufacturers of pharmaceutical preparations.

A further object of my invention is to provide an improved "straight-line" machine for folding the powders in their wrappers, in which machine the paper shall pass in a substantially straight line from a paper-roll, beneath a powder hopper and to the cutting-knife, without inverting or rotating the folded dose-containing base of the paper wrappers.

In the drawings,

Fig. 1 is a top plan-view of a machine that is adapted to carry out my invention.

Fig. 2 is a detail section of the feed-end of the straight-line paper-folding funnel, which forms an important part of my machine, the section being taken on the line 2—2 of Fig. 1.

Fig. 3 is an enlarged detail view of the delivery-end of the paper-folding funnel, looking at said end from the right hand of Fig. 1.

Fig. 4 is a fragmentary side-elevation of a cam on the gear-wheel which drives the package-delivering mechanism.

Figure 12:
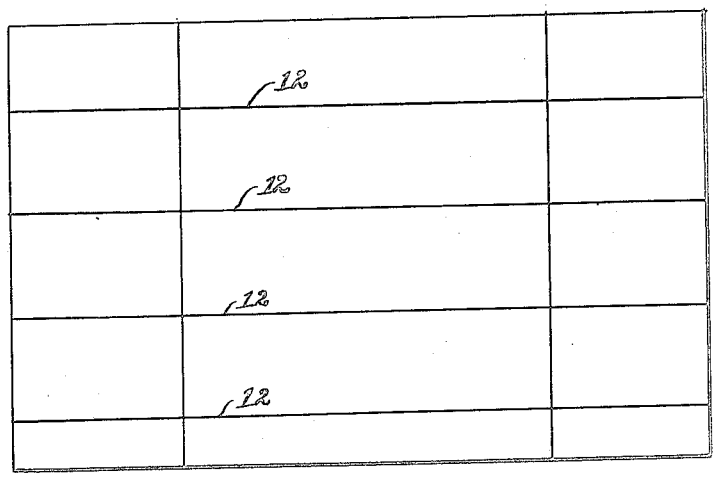

Fig. 5 is a side-elevation of the machine shown in Fig. 1.

Fig. 6 is a vertical transverse section of the feed-hooper and its actuating parts.

Fig. 7 is a side-elevation of a portion of the gear-wheel that drives the package-delivering mechanism and the cutting-knife.

Fig. 8 is a detail sectional side-elevation of the driving-gear and mounting of the feed-rolls and the tension-rolls used in the machine, the section being on line 8—8 of Fig. 1.

Fig. 9 is a detail front-elevation of the cutting-knife mountings, looking at same from the left-hand of Fig. 1.

Fig. 10 is a detail view of the final folding and discharge mechanism, in one position.

Fig. 11 is a view similar to the last, with the parts in a different position, and Figs. 12 to 15 inclusive are views of the cut-off paper and the dose of powder carried thereby, in the different stages of the folding and creasing operations.

*The straight-line distinguishing feature.*

A distinct characteristic of my invention is the fact that the paper passes from the paper-roll to the feed-end of the folding-funnel, thence beneath the powder-hopper, thence through said funnel, thence between opposite feed-rolls and soft tension-rolls, thence beneath a cutting-knife, and finally onto a folding and discharge mechanism, in approximately a horizontal straight line.

For the reasons just stated, my machine may be classed as a "straight line" machine, in contradistinction to those powder wrapping machines in which the paper is moved in a circular or sinuous path after it leaves the paper-roll.

*General description.*

The numeral 1 designates a suitable base, frame, table-top, or other support, upon which the various parts of the machine used in practicing my method, are mounted.

The paper-roll 2 is mounted upon a spool 3 having the usual core or spindle 4 supported by roll-standards 5, at one end of the said base 1.

The paper from said roll 2 is led, while in a flat condition, into the open larger end of a single long tapered paper-folder or funnel 6, the bottom of which extends horizontally, in a substantially straight line, continuously from a point adjacent said paper-roll toward the delivery end of the machine, where it terminates a short distance from a pair of feed-rolls 7.

The said hollow tapered folder 6 has a cross-section at its larger end that is substantially V-shaped, as shown in Fig. 2, at which point there are narrow top flanges 8 projecting inwardly from the opposite converging side-walls 9, which rise from a flat horizontal base 10, which extends from end-to-end of the folder in a straight line.

The delivery-end of said tapered folder 6 has the form shown in Fig. 3, which is produced by folding and shaping the sheet-metal (or other material) which composes the said top flanges 8, and side-walls 9, from a point about midway of the length of said folder to the delivery-end thereof, said top flanges being widened there for permitting such folding.

Figure 13:
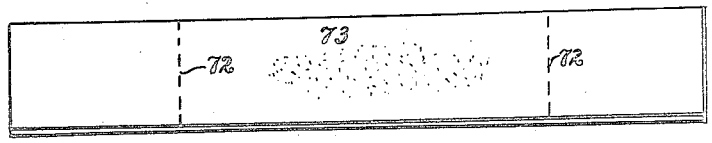

At and adjacent the delivery-end of said folder 6, the opposite side-walls 9 and the there widened top walls 8, are doubled upon each other transversely, to provide a folding passage for the paper strip passing therethrough; and said passage is thus formed with double flat upper and lower walls, and with opposite curved walls 11 at its edges, to fold the paper, as indicated by the parallel fold-lines 12 in Fig. 12, and to deliver the folded paper, with doses of powder folded therein, in the form shown in Fig. 13.

The said tapered folder 6 is supported, in the present case, by suitable brackets 14, which rest upon the said base 1.

The feed-hopper and actuating devices.

The paper, shortly after entering the feed-end of said tapered folder 6, passes beneath a feed-hopper 15, and receives therefrom definite quantities or doses of powder, separated from each other a distance corresponding to the length of the individual dose-wrappers, to be later cut off of the longitudinally-folded strip of paper that has been prepared (with the appropriate doses of powder in it at regular predetermined points) by the said tapered folder 6.

Said hopper 15 is supported, as shown in Fig. 6, upon a suitable base 16 having opposite longitudinal side-bars 17 from which rise braces 18 whose upper edges or ends are secured to the upstanding walls of the hopper, and said base and the side-bars rest upon the top cross-bars of the previously-described brackets 14.

The bottom of the said hopper 15 is normally closed by a dose-measuring slide 19, which has a measuring-pocket or tablet forming aperture 20 formed in it, and which slide is mounted upon said base 16, to move back and forth thereon, between said side-bars 17, so that when said measuring-pocket is located in said hopper it is filled with powder, which is packed in said pocket, in the form of a soft tablet, by the lower end of a vertical compressing-plunger 21, which is mounted to reciprocate in the said hopper in timed relation to the said slide.

In the present case, the said plunger 21, Fig. 6, is mounted within a tubular vertical hub 22 of a powder-stirrer that is also mounted in said hopper 15, the lower end of said hub having a shouldered journal 23 that revolves in a bearing formed in a bracket 24 projecting from the interior of said hopper, the construction being such that the said hub may freely rotate while the said plunger is non-revoluble but is freely movable axially within said hub.

Suitable stirring-devices 25 have their inner portions connected to the said hub 22, and other parts extended into said hopper 15, to engage the powder therein, and to keep it from caking, and cause it to gravitate to the bottom of the hopper and into the said measuring-pocket 20 of the said slide 19, promptly as required.

The said stirring-devices are driven by a belt pulley 26 fixed on the upper end of said stirring-device hub 22, and a belt 27 running upon said pulley and over idlers or guide-pulleys 28 mounted at the upper ends of the idler-stands 29, and thence downwardly and around a drive-pulley 30 which is fixed on a horizontal counter-shaft 31, to which power may be imparted in the manner hereinafter described.

The said slide 19, by means of which the doses of powder are measured, compressed, and discharged, is intermittently moved and permitted to rest, by a rock-lever 32 which is pivoted at 33 to the top of a pivot-stand or bracket 34 rising from said base 1; said rock-lever extending horizontally from a point above the said counter-shaft 31 to the end of said slide which projects at the right-hand of said feed-hopper 15, at which point said rock-lever is pivotally attached at 35 to said slide.

The outer end of said rock-lever carries a cam-roll 36 which is engaged by the opposite walls of a cam-groove 37 of a rock-lever cam 38 that is fixed upon the said counter-shaft 31.

The said vertical plunger 21, by means of which the doses of powder are compressed slightly, and formed into soft tablets within said slide pocket 21, is intermittently depressed and held in an elevated position by means of another rock-lever 39, the inner end of which is pivoted at 40 to the upper end of said plunger, and the outer end of which carries a cam-roll 41 running in a cam-groove 42 of a cam 43 that is also fixed on the said counter-shaft 31 at a point near the said cam 38, the said rock-lever 39 being fulcrumed at 44 to a bracket 45 clamped upon the upper edge of the said feed-hopper 15.

The said dose-measuring slide 19, is moved toward the left-hand in Figs. 1 and 5, after a dose of powder has been compressed in its said pocket 20, and it carries said compressed dose to a point out from under and clear of said hopper 15, as shown more clearly in Fig. 1, wherein the said slide has come to rest at the limit of its discharge movement.

The said slide 19 is held a short time at the limit of its discharge movement, by the action and construction of the said slide-actuating cam 38, so that the compressed dose-tablet which then occupies the said pocket 20 may be punched downwardly out of the latter and drop upon the strip of unfolded paper that lies beneath, in the larger end of the said tapered folder 6.

A dose-punch or plunger 46 is provided for that purpose, and it is moved vertically at the proper times, up and down, to detach the dose tablets from said slide 19. See Fig. 1.

Said dose-plunger 46 is a short vertical cylindrical body, of any suitable material, having a diameter slightly less than that of the said dose-pocket 20, and pivotally connected at its upper end to the adjacent overhanging end of a dose-ejecting rock-lever 47, by means of a common bolt or pivot-pin 48.

The said dose-ejecting lever 47 is pivotally mounted at 49 upon a common supporting-bracket 50, extending from the top of the adjacent supporting-bracket 14, the pivotal point of said lever being about midway of its length.

A roller 51 is carried by the outer portion of the said dose-ejecting lever 47, to operate in a cam-groove of a cam 52 of the same construction as the previously-described cam 43, and fixed on said counter-shaft 31 near the left-hand (or feed) end of the latter, so that as the said cam 52 is rotated, the said lever will be rocked at the proper times to punch the dose-tablets from said dose-pocket 20, then to elevate the said dose-punch 46 to its normal position above and out of contact with said slide 19, and to hold same elevated until another punching stroke is to be made.

The said counter-shaft 31 is mounted in common bearings 53 carried by the upper ends of suitable supporting-stands, as shown in Fig. 5, and it is driven by a bevel-gear wheel 54 fixed on the right-hand end of said shaft and meshing with another bevel-gear 55 that is fixed upon the adjacent laterally-extending upper feed-roll shaft 56, which is itself driven by spur-gear 57 fixed in meshing pairs upon the said upper feed-roll shaft and the lower feed-roll shaft 58, Fig. 8.

A large bevel-gear 59 is fixed upon the extended end of said lower feed-roll shaft 58, to drive said shaft, and said large bevel-gear is driven by a bevel-pinion 60 that is fixed on another counter-shaft 61, extending lengthwise of the machine, on the side thereof that is opposite that on which said counter-shaft 31 is located.

Said counter-shaft 61 is mounted in bearings 62 at the upper end of bearing-stands 63, and it is driven by a suitable motor 64 whose shaft 65 carries a pinion 66 that is in mesh with a gear-wheel 67 fixed on the adjacent projecting end of said counter-shaft.

Any other form of motive-power, and any other common arrangement of driving connections may be used.

The feed-roll mechanism.

The paper from the said paper-roll 2 is fed by hand, in starting the machine, into the larger end of the said tapered folder 6, where it is supplied with doses of powder from said feed-hopper 15, and is folded longitudinally upon said doses, in the form of a folded strip having a width four and one-half times less than that of the unfolded flat strip of paper, as shown in Figs. 12 and 13.

Said longitudinally-folded strip of paper, containing the doses of powder at intervals of its length, is led from the smaller (or delivery) end of said tapered folder 6, directly toward and between a pair of common feed-rolls 7, which preferably have a roughened or corrugated periphery, for frictionally engaging the paper, and drawing same through the said tapered folder.

Said feed rolls 7 are alike in size and construction, and the upper one is fixed upon said upper feed-roll shaft 56, and the lower one is mounted upon said lower feed-roll shaft 58, to be driven by the gearing previously described.

Preferably, as shown in Fig. 5, the upper feed-roll 7 is yieldingly urged into contact with the paper that is passing between said feed-rolls, by a common arrangement of a coiled spring 68 pressing upon the upper bearing-box 69 at each end of said upper roll, pressure of said spring being adjusted by a suitable tension-adjusting screw 70, at the upper end of the bearing-stand 71 of said rolls.

After passing through said feed-rolls 7, the paper presents the appearance shown in Fig. 13, but is devoid of the transverse dotted lines 72, the purpose of which will be explained hereinafter.

From said feed-rolls the dose-strip 73 (as it should now be called) passes onto a flat horizontal table-top 74, which is mounted upon a suitable stand 75 rising from the said base 1, and whereon the said dose-strip may be inspected, as well as supported before it reaches the tension-rolls and cutting-off knife, now to be described.

The tension rolls.

A pair of tension-rolls 76, made preferably of rubber, or having a soft rubber periphery, are provided with shafts or journals mounted in bearings which are similar in every way to those of the said feed-roll shafts 56 and 58, said bearings for said tension-roll shafts being carried by bearing-stands 77, which rise from said base 1 a short distance in advance of the location of said feed-roll bearing-stands 71.

Like the said upper feed-roll 7, the upper one of said tension-rolls 76 is yieldingly held in contact with the paper dose-strip 73 that passes between said rolls, by the same form of springs as the said springs 68 previously described in connection with the said feed-roll mountings, said springs bearing upon movable bearing-caps 69 at each end of said upper tension-roll, and tension-adjusting screws 70 being provided, for regulating (as required) the tension of the said springs.

Said tension-rolls 76 are separated from the said feed-rolls 7, or rather are in advance of the latter, about the length of the dose-containing packages that are to be cut from the said dose-strip 73, said table-top 74 being located to fill the gap between said two sets of rolls, and to support and guide the said dose-strip on its way from said feed-rolls to and between the said tension-rolls.

Power is imparted to said tension-rolls 76, in the present instance, by a sprocket-chain 78, which is mounted upon a spocket-wheel 79 fixed on said lower feed-roll shaft 58 and engaging a similar sprocket-wheel 80 fixed on the shaft 81 of the lower one of said tension-rolls, and the upper and lower tension-rolls are geared together, and the upper one thereof is positively driven, by spur-gears which are like the gears 57 previously described for gearing together the said feed-rolls 7. See Fig. 8.

The purpose of the tension-rolls 76, is to draw (and hold) taut the dose-strip 73 after same has passed between said feed-rolls 7, and to prepare said strip for the cutting-knife.

The drawing action is accomplished, in the present instance, by making the diameter of the said tension-rolls very slightly greater than that of the said feed-rolls, so that although both sets of rolls are driven at the same speed, the larger tension-rolls will tend to move the dose-strip slightly faster than same is moved by the said feed-rolls, and said strip will thus be drawn tight and smooth after it has passed through said feed-rolls.

A short delivery-platform receives and supports the paper dose-strip 73 after it has passed between said tension-rolls 76, and carries same beneath the cutting-knife, whose construction and operation will now be described in detail.

*The cutting-knife.*

As shown in detail in Fig. 9, a vertical cutting-knife 83 is mounted to slide in guides 84 which are riveted or otherwise secured to the delivery-side of a cutting-knife stand 85 that is set on said base 1, so that the dose-strip 73 will pass from said short delivery-platform 82 beneath said cutting-knife when the latter is elevated.

Said knife-stand 85 is provided with a flat horizontal top or cover-flange 86, to which is secured the upper end of a coil-spring 87.

The lower end of said spring 87 is secured to a flat knife-lifting link 88, which is attached to said cutting-knife by a pin or bolt 89, so that said knife is held normally elevated a short distance above a fixed cutter 90 carried by said knife-stand 85, to permit the said dose-strip 73 to pass between said knife and said fixed cutter.

A knife-depressing lever 91 is pivoted at 92 to the side of said knife-stand 85, and extends obliquely across said knife-guards 84 to a point adjacent the opposite edge of said knife-stand, where it carries a common stirrup or vertical arm 93 which has a horizontal part 94, for a purpose now to be described.

A rock-shaft 95 is mounted horizontally in a bearing 96 near the top of said knife-stand 85, and a similar bearing at the top of a bearing stand 97 rising from said base 1 at a point some distance in advance of the said knife-stand; and said rock-shaft is provided with a lateral pin or finger 98 at a point beneath said knife-lever 91, so that when said shaft is rocked in one direction the said lateral finger will be moved downwardly into engagement with said horizontal part 94 of said stirrup 93, and carry with it the latter, as well as the free end of said knife-lever.

The lower edge of said knife-lever 91 is in contact with the said knife-pin 89, which projects in the path of said lever; so that when the latter is moved downwardly the cutting-knife will be actuated, and the dose-strip 73 will be severed between the edge of said knife and the said fixed cutter 90.

A crank or finger 99 is fixed on the right-hand end of said rock-shaft 95, and projects normally in the path of a pin or lug 100 projecting inwardly from the face of an adjacent large gear-wheel 101, as said pin or lug is moved downwardly, and said rock-shaft is thereby actuated in one direction, the power of said coiled spring 87 on the knife-stand 85, returning all of the connected parts to their normal positions. See Fig. 7 for a detail view of the said crank or finger 99, and its actuating gear-wheel pin 100.

The large gear-wheel 101 is fixed upon a short shaft 102 which is mounted in bearings at the top of bearing-stands 103 and 104, respectively, which rise from the base 1 of the machine, near the delivery end thereof.

A pinion 105 is fixed on the said counter-shaft 61, near said motor 64, and meshes with the teeth of said large gear-wheel, to drive the latter.

*The discharging mechanism for the wrappers.*

After the cutting-knife 83 has severed a longitudinally folded wrapper from the dose-strip 73, in the manner above described, said wrapper then presents the appearance (in plan view) in which it is shown in Fig. 13, and in order to complete the wrapper, and to close its ends against the accidental exit of the contained dose of powder, the said wrapper is creased and folded transversely at some distance from each end, as indicated by the dotted lines 72.

The final folding and discharge mechanism now to be described, performs the function just mentioned.

The uncut dose-strip 73, as it emerges from between the said tension-rolls 76, pushes the wrapper (which has just been severed) onto a spring-supported drop-table 106, which is provided with a shaft or pintles 107 at one edge, and is normally yieldingly supported in a horizontal position in the path of the cut wrappers, as the latter leave the said cutting-knife 83.

The pintles 107 of said drop-table 106 are mounted in suitable bearings, as 108, supported in a workmanlike and mechanical manner from said base 1, and a common spring 109 is coiled about one of the said pintles, and has one of its ends bearing against the said drop-table, and has its opposite end engaging the adjacent bearing 108 or some other fixed object, so that said table will be normally spring-supported in a horizontal plane, and yet be capable of being partially rotated on its pintles when it is depressed by the slotted delivery-paddle 110, now to be described.

Said delivery-paddle 110 is provided with two parallel slots 111, which extend transversely of said paddle from its free edge almost to its opposite edge, which latter is secured to said large gear-wheel shaft 102, so that the latter causes the paddle to be rotated with said gear-wheel 101.

The timing of said large gear-wheel shaft 102 is such that said delivery-paddle makes one complete revolution each time a wrapper is cut off and delivered; and said paddle reaches a position just above the cut-off wrapper while the latter is supported by the said drop-table 106, which is the position in which it is shown in Figs. 1, 4 and 10, which see.

Figures 14, 15:

With the timing just described, the said rotating slotted delivery-paddle 110, will be brought down upon the cut wrapper as it lays upon the said drop-table 106, Fig. 10, and will force the latter downwardly to a position between opposite spring-pressed folding-arms 112, which bend the ends of the wrapper on the transverse dotted lines 72, Fig. 13, and cause said ends to be bent or folded inwardly, until they assume a position overhanging the body of the wrapper containing the dose of powder, as shown in Fig. 15.

Then, as the downward movement of the said slotted delivery-paddle 110 continues, the transversely-folded wrapper will be detached from the opposite creasing-slots 114 of the said spring-arms 112, and will be brought to the position indicated in Fig. 11, where said wrapper will be engaged by the arms 115 of a rocking detaching-fork, and be thereby detached, and be caused to drop to a suitable receptacle (not shown), from which the finished wrapped doses may be removed and placed in boxes or packages, ready for the market.

A hole 116 may be cut in the base 1, to permit the finished wrapped doses to fall into a receptacle (not shown) beneath the said base.

The said folding-arms 112 are upstanding, being pivoted at 117 to suitable stands 118 which rest upon the base 1 or other part of the machine, and said arms are yieldingly held in an upstanding position by front and back springs 119 of common construction, so that the walls of the said creasing-slots 114 of the said arms will be held yieldingly in contact with the transverse folds of the wrapped doses.

Said rocking detaching-fork has its said arms 115 projecting at a right-angle from a rock-shaft 120 that is mounted in bearings 121 that are set upon said base 1.

Motion is communicated to the said arms 115 of said detaching-fork, by a cam-segment 122, Fig. 4, which is fastened to the inner face of the said large gear-wheel 101, and projects laterally therefrom, and rides over and depresses a crank 123 that is fixed on the adjacent right-hand end of said rock-shaft 120, to rock the latter in one direction, as previously described, in detaching the completed wrapped doses from the said slotted delivery-paddle 110.

The said slots 111 in said delivery-paddle 110, permit the arms 115 of said detaching-fork to engage the finished dose-wrappers, as shown in Fig. 11; said slots permitting also the continuous rotation of said slotted paddle without contact with said fork arms, the slotted portions of said paddle straddling said arms as it passes them.

*Means for timing the dose-slide and the feed-rolls.*

A clutch, or a common change-speed gear of some kind, should be provided at some point in the driving mechanism between the said dose-slide 19 and the said feed-rolls 7, whereby the movement of the paper may be timed or adjusted in conformity with the movement of the said dose-slide, so that the proper length of paper will be fed before and after each dose-tablet of powder is delivered to the paper.

The desired relative movements, or synchronization, of said parts is brought about in the present form of my machine, by a common clutch having toothed-jaws 124 and 125, Fig. 1, which engage each other to drive said dose-slide 19 and its cooperating parts, and which are disengaged to stop said slide, in case the doses of powder are being delivered to the paper too close together.

The said clutch-jaws are fixed on two sections of the said counter-shaft 31, which drives said slide, the jaw 124 being carried by one section of said shaft, and the said jaw 125 being fixed on the other section of said shaft, which is divided (as usual) at a point between said jaws, the said jaw 124 being slidable on said shaft, or splined thereon, in case the said shaft is left in one piece, and a common hand-lever 126 is pivotally mounted at 127 on a stand 128, for operating said slidable jaw. A spring 129 normally urges said movable clutch-jaw into engagement with the opposite jaw.

Referring again to the discharging-mechanism, I would point out that some sort of a device should be provided for normally holding the said arms 115 of the said rocking detaching-fork in a substantially upright position; and in the present case I have shown a common spring 130 for that purpose, and, as shown, said spring is coiled around the rock-shaft 120 of said fork, and has its ends secured respectively to said shaft and to the adjacent rock-shaft bearing 121.

The operation.

The operation of my invention will be readily apparent without farther description; but I wish to reiterate the statement previously made in the above "further object" of my invention, as well as to the subsequent statement under the heading of "the straight-line distinguishing feature", that the strip of paper from the said paper-roll 2 passes from said roll to the discharge-mechanism, in approximately a horizontal straight line.

I also call attention to the fact that the doses of powder, after being deposited upon the paper, are never turned upside down in their passage to the discharge-mechanism, but said doses rest throughout said passage upon the central part of the paper, upon which they were primarily deposited, and which part is the bottom of the finished wrapped package of powder.

I also direct attention to the flat horizontal base, or bottom, 10, of the tapered folder 6, upon which the central part of the paper rests throughout the passage of the paper whilst in said tapered folder, after the doses have been deposited upon the central part of said paper.

I claim the following:—

A machine for measuring and wrapping powders, comprising means for supplying a strip of paper; a dose-depositing device, which deposits the powder on said strip of paper at intervals in the length of the latter, in measured doses; a single long straight-line hollow paper-folder extending in a horizontal position from said dose-depositing device to a delivery-roll, and having opposite walls between which said strip of paper is primarily passed, and thereby folded longitudinally over said measured doses, the dose-supporting bottom wall being straight and flat and extending continuously in a horizontal plane from the receiving-end to the delivery end of said folder; feed-rolls, for drawing said dose-carrying longitudinally-folded strip of paper through said tapered-folder; a cutting-knife for severing said strip into short lengths after it has passed said feed-rolls; and delivery-mechanism constructed to fold the ends of the severed short lengths of paper, to retain the dose of powder that is carried by them.

GERHARD KNEWITZ.

Witnesses:
 WINIFRED McHALE,
 JOHN C. HIGDON.